(12) United States Patent
Ameil et al.

(10) Patent No.: US 10,350,854 B2
(45) Date of Patent: Jul. 16, 2019

(54) FUNCTIONAL PROTECTIVE MATERIAL, IN PARTICULAR FOR USE IN PROTECTIVE CLOTHING (75) Inventors: Frederic Ameil, Erzhausen (DE); Jürgen Gerl, Dietzenbach (DE); Alicja Surowiec, Dreieich (DE); Hasso Von Blücher, Erkrath (DE)

(73) Assignee: Blücher GmbH, Erkrath (DE)

( * ) Notice: Subject to any disclaimer, the term of this patent is extended or adjusted under 35 U.S.C. 154(b) by 1008 days.

(21) Appl. No.: 14/124,887

(22) PCT Filed: Jun. 8, 2012

(86) PCT No.: PCT/EP2012/002432
§ 371 (c)(1),
(2), (4) Date: Mar. 17, 2014

(87) PCT Pub. No.: WO2012/167939
PCT Pub. Date: Dec. 13, 2012

(65) Prior Publication Data
US 2014/0182050 A1 Jul. 3, 2014

(30) Foreign Application Priority Data
Jun. 8, 2011 (DE) .................. 10 2011 106 087

(51) Int. Cl.
*B32B 5/24* (2006.01)
*A62D 5/00* (2006.01)
*A62B 17/00* (2006.01)

(52) U.S. Cl.
CPC ............ *B32B 5/245* (2013.01); *A62B 17/006* (2013.01); *A62D 5/00* (2013.01); *Y10T 442/3325* (2015.04)

(58) Field of Classification Search
CPC ........ B32B 2307/724; B32B 2307/726; A62B 17/006; A62D 5/00;
(Continued)

(56) References Cited

U.S. PATENT DOCUMENTS

2005/0249917 A1* 11/2005 Trentacosta ....... B01D 39/1692
428/137
2010/0107657 A1* 5/2010 Vistakula ............ A41D 13/005
62/3.5
(Continued)

FOREIGN PATENT DOCUMENTS

DE 69502354 T2 10/1998
EP 0562303 A2 9/1993
(Continued)

OTHER PUBLICATIONS

N.I. Shtanko, Preparation of permeability-controlled track membranes on the basis of 'smart' polymers, Journal of Membrane Science, vol. 179, Issues 1-2, Nov. 15, 2000, pp. 155-161.*

Primary Examiner — Jenna L Johnson
(74) Attorney, Agent, or Firm — Edward E. Sowers; Brannon Sowers & Cracraft PC (57) ABSTRACT The invention relates to a functional protective material, in particular having a protective function with respect to chemical poisons and/or biological toxins and/or chemical and/or biological hazardous materials, such as warfare agents, wherein the functional protective material has a multi-layer structure that comprises a planar, in particular textile, substrate material and a membrane that is associated with the substrate material, in particular connected to the substrate material, wherein the membrane in itself is permeable to air and water vapor and therefore is provided with a plurality of micropores preferably distributed substantially evenly over the membrane surface. According to the invention, an operating parameter of the membrane can be changed in such a way that the membrane assumes two different operating states, wherein in the first operating state
(Continued)

the micropores of the membrane are open and in the second operating state, the micropores of the membrane are at least predominantly closed.

25 Claims, 5 Drawing Sheets

(58) Field of Classification Search
CPC ......... Y10T 442/3325–3374; Y10T 442/2139; Y10T 442/2148; Y10T 442/2164
USPC ........................ 442/76, 77, 79–84, 121, 122; 428/304.4–319.9; 2/457
See application file for complete search history.

(56) References Cited

U.S. PATENT DOCUMENTS

| | | | |
|---|---|---|---|
| 2011/0113538 A1 | 5/2011 | Von Blucher | |
| 2013/0109773 A1* | 5/2013 | Hebbrecht | ............... C08J 3/075 521/134 |

FOREIGN PATENT DOCUMENTS

| | | |
|---|---|---|
| EP | 1776883 A2 | 4/2007 |
| RU | 2234361 | 8/2004 |
| WO | 0010504 | 3/2000 |
| WO | 2009086858 A1 | 7/2009 |

* cited by examiner

FUNCTIONAL PROTECTIVE MATERIAL, IN PARTICULAR FOR USE IN PROTECTIVE CLOTHING

CROSS-REFERENCES TO RELATED APPLICATIONS

This application is a National Stage filing of International Application PCT/EP2012/002432, filed Jun. 8, 2012, claiming priority to German Application No. DE 10 2011 106 087.5 filed Jun. 8, 2011, entitled "FUNCTIONAL PROTECTIVE MATERIAL, IN PARTICULAR FOR USE IN PROTECTIVE CLOTHING." The subject application claims priority to PCT/EP2012/002432, and to German Application No. DE 10 2011 106 087.5 and incorporates all by reference herein, in their entirety.

BACKGROUND OF THE INVENTION

The present invention relates to a functional protective material, in particular with protective functions with regard to chemical and/or biological poisons and/or noxiants, which has a multilayered construction and contains a membrane, in particular for use in a protective apparel, with the features set out herein.

The present invention further relates to a membrane for use in a functional protective material of this type, as classified herein.

The present invention further relates to the use of the inventive protective material and/or membrane as defined herein and also to protective articles as defined below, which were obtained using the inventive protective material and/or membrane.

The present invention additionally relates to the use of the inventive protective material and/or membrane in the manufacture of protective materials of any kind (such as, for example, protective suits, protective gloves, protective shoes and other protective apparel pieces and also protective covers, for example for medical transports, tents, sleeping bags and the like).

The present invention finally relates to protective articles comprising the inventive protective material and/or membrane and/or obtained using the inventive protective material and/or membrane. The inventive protective material and/or membrane are thus useful not only for the military sector but also for the civil sector, in particular for NBC deployment.

There are a series of substances which are taken up by the skin and lead to serious physical harm (noxae). Examples include the vesicatory Hd (interchangeably referred to as Yellow Cross and mustard gas) and the nerve agent sarin. People likely to come into contact with such poisons must wear suitable protective apparel and/or be protected against these poisons by suitable protective materials. In addition, people likely to come into contact with other toxic substances also need to be protected through appropriate protective apparel and/or materials.

Protective apparel and/or materials known for this purpose include for example air and water vapor impervious protective suits equipped with a rubber layer impervious to chemical poisons. These suits are disadvantageous in that they very quickly lead to a heat build-up, since they are air and water vapor impervious. Other disadvantages here include the nonexistent breathability and also the nonexistent exchange of air.

Protective suits against chemical warfare agents that are intended for prolonged deployment under a very wide variety of conditions, however, must not lead to a heat build-up for the wearer. To this end, air and water vapor pervious protective suits are known in the prior art, which offer a relatively high wearing comfort. Air and water vapor pervious protective suits of this type often possess an adsorptive filtering layer of activated carbon to permanently bind the chemical poisons. The advantage of systems of this type is that the activated carbon is also accessible on the inside surface, ensuring rapid adsorption of poisons which have penetrated at damaged or otherwise nontight places. Under extreme conditions, in particular when a drop of a thickened poisonous or warfare agent lands on the protective suit material from a comparatively great height and strikes through to the activated carbon, however, the layer of activated carbon can be locally inadequate. In addition, the protective performance which protective suits of this type offer in respect of biological noxiants is often also inadequate.

Permeable, adsorptive filtering systems, in particular those based on activated carbon, are therefore often additized with a catalytically active component by impregnating the activated carbon for example with a biocidal and/or biostatic catalyst, in particular one based on metals or metal compounds.

A protective material of this type is described for example in DE 195 19 869 A1, which contains a multi-ply, textile, gas-pervious filtering material comprising an adsorption layer based on activated carbon, more particularly in the form of carbonized fibers, the activated carbon being impregnated with a catalyst selected from the group consisting of copper, cadmium, platinum, palladium, mercury and zinc, in amounts ranging from 0.05% to 12% by weight, based on the activated-carbon material. The disadvantage with this protective material and/or filtering system is the fact that impregnation with the catalyst destroys a portion of the adsorption capacity needed for adsorbing and thus disarming chemical noxiants. The impregnating operation thus has an adverse impact on the performance capability of the activated carbon used. Furthermore, impregnating the activated-carbon material is relatively costly and inconvenient and often compromises the manufacturing operation for the activated carbon, more particularly the activating step. Moreover, impregnation with the catalyst does not always provide the desired efficacy with regard to biological noxiants and/or microorganisms, and the problem of poisonous or warfare agents striking through at high concentrations is not always solved by this principle. Finally, the impregnating operation requires relatively large amounts of the catalyst material.

The prior art further includes protective suits engineered to be air impervious yet water vapor pervious, or breathable. Protective suits of this type generally comprise a membrane that acts as an air impervious yet water vapor pervious or breathable blocking layer with regard to poisonous and/or warfare agents. However, protective suits comprising membrane systems of this type do not always deliver an adequate protective performance. In addition, the protective membranes often used in this context in the prior art as blocking-layer membranes of this type do not always ensure adequate breathability, especially not under deployment conditions involving physical exertion, and therefore the wearing comfort is occasionally compromised as a consequence of the lack of air exchange and/or the lack of emission of water vapor through the protective material. In addition, protective materials used in the prior art may also comprise a microporous membrane. Membrane systems of this type generally do have an elevated ability to transmit water vapor, but also have the disadvantage that the pores in the microporous membrane system may occasionally be pervious to small molecules in particular, including for example the toxic substances hydrogen cyanide and chlorine gas. Membrane systems of this type are thus not always able to provide effective protection against noxiants and/or poisons in the form of small (gas) molecules in particular.

The problem area mentioned above was already recognized and addressed in the prior art from which the present invention proceeds (WO 2009/086858 A1). According to its solution, the membrane, which is inherently air and water vapor pervious by virtue of its having for this purpose a multiplicity of micropores distributed essentially uniformly over the membrane area, is endowed with a reactive additization, especially with a catalytically active component possessing reactivity with regard to chemical and/or biological poisons and/or noxiants. As a result, the multilayered functional protective material additized with a membrane of this type delivers an improved protective performance with regard to chemical and/or biological poisons/noxiants. This additization of the membrane ensures that poisonous/noxiant agents are degraded before they can come into contact with any adsorptive layer.

Yet even a thus additized membrane of a functional protective material of this type still presents a problem because the membrane is inherently pervious to air and water vapor and should also be so on account of the wearing comfort. Deployment by a user, then, may give rise to the situation that, for example, organic substances such as splashes of vehicle motor fuels landing on the functional protective material in the course of the refueling of motor vehicles pass through the micropores in the membrane and saturate the adsorptive material situated thereunder in the construction. In the later incidence of biological poisons and noxiants, such as warfare agents, the adsorptive material is then ineffective at this location.

In a previous attempt to solve this problem, a protective apparel composed of a corresponding protective material is additionally assigned an outer shell (DE 20 2009 004 718 U1). But this is very inconvenient in practice.

BRIEF SUMMARY OF THE INVENTION

The problem addressed by the present teaching is therefore that of configuring and further developing the known functional protective material such that the above-described unintended regional saturation of the adsorptive material is avoided or at least ameliorated.

Ultimately, the primary problem area addressed by the present invention is further that of providing a protective material which combines a high water vapor transmission rate and hence a high wearing comfort with a very effective protective performance with regard to chemical and/or biological poisons and noxiants, such as warfare agents.

The present invention yet further has for its object to provide a protective material that is more particularly suitable for use in protective articles (such as, for example, protective suits, protective gloves, protective shoes and other protective apparel pieces and also protective covers, sleeping bags and the like) and assures high wearing comfort when put to such use.

To achieve this object, the present invention proposes a functional protective material according to the present disclosure and also a membrane as described herein, while advantageous embodiments of the protective material and of the membrane each form the subject matter of dependent claims. By way of further solution to the problem defined above, the present invention proposes a use and protective articles.

The problem defined above is solved in relation to a functional protective material having the features provided herein.

Specifically, an operating parameter of the membrane is alterable such that the membrane assumes two different operating states, wherein the micropores of the membrane are open in the first operating state and at least predominantly, but preferably completely, closed in the second operating state.

According to the present invention, the membrane used in the functional protective material has a controllable, specifically switchable, porosity. The micropores can either be open or at least predominantly closed, depending on the setting of the operating parameter of the membrane. In the latter operating state, the membrane is completely impervious.

Unlike the prior art, a protective article manufactured from a functional protective material of the present type is not vented in some other way from the inside (DE 200 13 797 U1; U.S. Pat. No. 3,174,300; EP 1 494 760 B1). On the contrary, the membrane itself is switchable and can assume two states, namely the first state where the membrane is pervious to air and water vapor and the second state where the membrane is no longer pervious to air and water vapor, since its micropores are preferably closed.

DETAILED DESCRIPTION OF THE INVENTION

Preferred embodiments and developments of the inventive functional protective material comprising an inventive membrane are disclosed herein and the subject matter of claims relating to the functional protective material. These will now be elucidated in detail.

The fundamental idea of the present invention consists in altering an operating parameter of the membrane such that the membrane can assume two different operating states, depending on the value of the operating parameter. The micropores of the membrane are open in the first operating state and at least predominantly closed in the second operating state of the membrane.

There are various possible ways to realize a membrane having a controllable, specifically switchable, porosity.

Different operating parameters of the membrane can be influenced. One conceivable membrane, for example, is alterable in its lateral path resistance and works in the manner of a PTC or NTC resistor.

In a particularly preferred embodiment of the present invention, however, the operating parameter is the operating temperature of the membrane and the first operating state is achievable by heating the membrane from a low operating temperature to a high operating temperature and the second operating state is achievable by cooling the membrane from a high operating temperature to a low operating temperature. In this embodiment, the surface temperature of the membrane is influenced directly.

Tests have shown that, in an advantageous embodiment for the frequent use of the functional protective material in a protective apparel for persons, the high operating temperature of the membrane lies at 25° C. to 40° C. and the low operating temperature of the membrane lies by about 5° C. to 25° C., preferably about 6° C. to 15° C., below the high operating temperature of the membrane.

It is further necessary to resolve how the change in the operating parameter of the membrane is transposed into a change in the porosity of the membrane. Again there are various possibilities for this.

It is first possible to coat the membrane, especially in the region of the micropores, with a hydrogel (see, for example, the EP-A-0 562 303 document, which relates to a "chemical valve") or to embody one ply of the membrane as a hydrogel.

Normally, exposing a microporous membrane in a functional protective material of the type in question to water vapor does not cause impairment of the membrane's water vapor transmission rate. After all, it is the very purpose of the membrane to have a high water vapor transmission rate in this respect. However, when the membrane is coated with a hydrogel of appropriate layer thickness, the state of swell of the hydrogel will depend on the operating temperature of the membrane. The hydrogel, which is thermosensitive, stays in a collapsed state above its switching temperature, water present therein has been released as water vapor, and the micropores are water vapor pervious. Cooling the membrane to below the switching temperature of the hydrogel will cause the hydrogel to swell in the presence of water and thus close the micropores.

The realization of a membrane with switchable porosity by deploying a thermosensitive hydrogel has been experimentally verified. However, a functional protective material having a membrane of this type is difficult to produce.

In a simpler-to-realize alternative, the micropores in the membrane are directly closed by water present, especially held by adhesion, therein. In this case, closing the micropores in the membrane utilizes water which, in the second operating state, condenses on the membrane and closes the micropores in the membrane, at least predominantly. The ingress of water into the micropores is particularly due to the action of the capillary forces which occur in the micropores, i.e., by adhesion to the inside surfaces of the micropores. This is thus a case of exploiting the effect of capillary ascension, which occurs when the force of cohesion within the liquid is small compared with the force of adhesion of the liquid to walls, i.e., the walls of the micropores in the membrane, viz., the surface is wetted by the liquid. The smaller the diameter of a capillary, the greater the capillarity and the height of rise of the liquid in the capillary.

In the case of a water-filled glass tube open to the air at sea level, the theoretical height of rise is 1.4 m at 20° C. for a capillary 20 μm in diameter. It will be appreciated that, since only forces of adhesion are involved, the column of liquid in the capillary can only climb to the end thereof, even if the capillarity would actually allow a greater height of rise.

The above-described phenomenon of capillarity is exploited according to the present invention through the micropores in the membrane. An operating parameter of the membrane is altered such that liquid water is present, i.e., condensed, on the membrane, so this water will be sucked into the micropores by capillary force. The micropores accordingly are closed by water in this operating state. The membrane which is otherwise pervious to air and water vapor is impervious to air and water vapor in this operating state. Merely water-soluble substances can dissolve in the water which is present in the micropores. They cannot pass through the membrane, however.

The result is that, according to the present invention, the membrane of the functional protective material is controllable between the first operating state, in which it is pervious to air and water vapor, and the second operating state, in which its micropores are at least overwhelmingly closed by water present therein.

The invention takes advantage of the special circumstances within a protective apparel comprising such a functional protective material in this embodiment in particular. A user of such a functional protective material has a high rate of perspiration, and the water vapor pressure within such a protective suit is relatively high. It can be assumed that, given appropriate cooling of the membrane in the second operating state, sufficient condensation of water will occur on the inside surface of the membrane.

In the situation described at the outset for a user of such a functional protective material, the user can deliberately put the membrane of the functional protective material into the second operating state comprising closed micropores and thereby prevent the ingress of noxiants which are unwelcome and more particularly saturate the adsorptive material possibly present. Later, when the user of the functional protective material has completed his or her task for which he or she had to use the functional protective material, he or she can put the membrane of the functional protective material back into its first operating state. The membrane is then pervious again to air and water vapor, since the micropores are no longer closed by water. The protective material has reattained its originally desired high water vapor transmission rate and the pleasant wearing comfort associated therewith.

The relevant operating parameter used here is the operating temperature of the membrane. When the operating temperature of the membrane is high, water does not condense on the membrane, the water in the vicinity of the membrane is only present in the form of water vapor and can pervade the open micropores. When the temperature of the membrane decreases, water vapor condenses on the membrane. The condensation forming on the membrane is sucked into the micropores by capillary action and closes the micropores in the membrane.

The functionality of the membrane forming part of the functional protective material and the controllability of the membrane are particularly good when the reaction of the micropores to a change in the operating temperature is very uniform. It is advisable in this connection for the micropores of the membrane to have an essentially uniform shape and size, especially a circular shape.

While the micropores in the membrane preferably have very small diameters in the prior art forming the starting point, the concept of the present invention lets the micropores in the membrane become somewhat larger on average, so the water vapor transmission rate improves. Preferably, according to the present invention, the micropores of the membranes have an average diameter sufficiently small to hold water in the micropores by capillary force, especially an average diameter between 1 µm and 15 µm, preferably between 4 µm and 12 µm.

According to the preferred teaching of the present invention, a particularly advantageous membrane has a thickness between 1 µm and 500 µm, especially between 10 µm and 100 µm, preferably between 20 µm and 70 µm. It must be noted in this context that a membrane of this type typically has a basis weight of 0.5 g/m$^2$ to 100 g/m$^2$, especially of 1 g/m$^2$ to 35 g/m$^2$.

In the recommended distribution of the micropores of the membrane, the area fraction of micropores on the membrane is between 1% and 50%, especially between 2% and 30%, preferably between 5% and 25%.

It must be noted in this connection that the membrane which is controllable in its porosity, or switchable, according to the present invention and forms part of a functional protective material according to the present invention can be combined with the reactive additization known from the prior art discussed at the outset (WO 2009/086858 A1) of the membrane, especially in the region of the micropores. The citation forming the starting point for the present teaching is hereby incorporated herein by reference with regard to details of this reactive additization of the membrane, especially in the region of the micropores.

It is further in accordance with the preferred teaching of the present invention that the membrane is embodied as a foil of plastic, ceramic or metal or as a multi-ply foil having plies of plastic and/or ceramic and/or metal. In a multi-ply embodiment of the membrane, the individual plies can be assigned different offices within the composite forming the membrane.

In a further embodiment in accordance with the preferred teaching, the membrane comprises or consists of a plastic and/or a polymer, particularly wherein the plastic and/or the polymer is selected from the group of polyurethanes, polyetheramides, polyesteramides, polyetheresters, polytetrafluoroethylenes and/or cellulose-based polymers and/or derivatives of the aforementioned compounds, preferably polyetheresters and polytetrafluoroethylenes, wherein, more preferably, the membrane consists of polyethylene (PE).

Especially when the membrane consists of a plastic, especially polyethylene (PE), the lateral thermal conductivity of the membrane will usually not be high enough for practical use on large areas. True, plastics can also be modified appropriately to enhance their lateral thermal conductivity. But this may not be sufficient for the use scenarios the present invention envisages for a functional protective material.

If, therefore, the lateral thermal conductivity is insufficient for a uniform temperature change of the membrane within acceptable periods of time (switching times), it can be advisable for the membrane to comprise an additization, ply or, preferably, coating leading to an enhanced lateral thermal conductivity of the membrane.

In a particularly preferred example of an additional additization, ply or coating to improve the lateral thermal conductivity, the additization, ply or, preferably, coating consists of an efficiently heat-conducting, preferably chemically inert, material, especially a metal or a metal alloy, most particularly gold. In a very particularly preferred embodiment, the coating of gold has a thickness between 5 nm and 1000 nm, preferably between 100 nm and 800 nm.

The wettability of surfaces coming into contact with the condensing water is particularly important. The capillarity of the micropores in the membrane relies on the wettability of the surface of the membrane, especially on the inner walls of the micropores. The capillarity can be influenced by mechanical and/or chemical surface treatment of the membrane, especially in the region of its micropores (see appropriate proposals in EP 0 563 605 A1 for example). According to the present invention, the membrane, especially in the region of the micropores, is treated in the surface such that the desired capillarity for practical deployment ensues.

A coating to enhance the lateral thermal conductivity may cause the capillarity to deteriorate in the region of the coating. In an advisable embodiment, therefore, the actually advantageous coating to enhance the lateral thermal conductivity of the membrane is not applied both-sidedly, but only one-sidedly to the foil-type material otherwise forming the membrane. This produces the desired high lateral thermal conductivity for the membrane, while at the same time the high, capillarity-improving wettability of the membrane is retained on one side and in the micropores of the membrane.

Advantageously, the latter side will face inward, toward the wearer in the functional protective material of the present invention, while the opposite side of the membrane, the side with the coating to improve the thermal conductivity, is made to face outward. This is because there is every likelihood in the use scenario that the condensing water vapor will be on the inside surface of the membrane.

It has so far not been mentioned how the desired operating parameter of the membrane can be altered in the desired manner. It will be appreciated that there are again various possibilities for this.

Chosen as the operating parameter to be altered, the working temperature of the membrane can be changed directly by passing an electric current of defined strength through the membrane which for this purpose has been embodied to have limited electrical conductivity. The membrane, or that ply of a multi-ply membrane which has the desired conductivity, acts as heat conductor in the process. The flow of a current heats up the membrane and drives off the water in the micropores.

One problem with the method described above is that, although the membrane can be brought in this way from an essentially closed state into an operating state in which the micropores are essentially open, the reverse switching operation is difficult and in any event slow, since only the natural cooling of the membrane can be utilized.

In an advisable embodiment of the present invention, therefore, the membrane is thermally coupled to a means for cooling and preferably also for heating the membrane and/or a ply or coating of the membrane. According to the preferred teaching of the present invention, the means is an electrothermally operating means, preferably embodied as Peltier means, particularly embodied as a plurality of Peltier elements distributed across the membrane.

An electrothermally working means is particularly advantageous because no mechanically moving parts are needed here. The use of coolants is also not necessary. On the contrary, the electrothermal effect ensues without any moving part or element.

The Peltier means which, according to the present invention, is to be used for preference is an electrothermal transformer which relies on the Peltier effect (Brockhaus "NATURWISSENSCHAFTEN UND TECHNIK" volume 4 NI-SN, Wiesbaden 1983, page 60, the entry for *Peltiereffekt*; see also the above-cited DE 200 13 797 U1 document). The flow of a current through a Peltier means creates a temperature difference at mutually opposite ends. A Peltier element these days typically consists of at least two differently doped semiconductors which differ in the energy level of their conducting bands. When a current is passed through two serially connected contacts of these materials, thermal energy will be absorbed at one contact. At the other contact, the electrons return from the higher back to the lower energy level of the adjacent conducting band. This releases energy in the form of heat. Removing this heat to keep the temperature at this location essentially the same leads to cooling at the first contact. The action of the flowing electric current pumps heat from the cold side to the warm side to create a temperature difference.

By reversing the direction of the current, the assignment of the contacts can be changed with a Peltier element. It is thus possible to switch from "cooling" to "heating".

Because of the larger area of the membrane in a functional protective material of the type in question it is particularly advantageous according to the present invention to use not just one central Peltier means but altogether a plurality of distributed Peltier elements. The areal size of Peltier elements is limited in any case. By using a plurality of Peltier elements, thermally coupled directly to the membrane or its conductive coating, more uniform cooling or heating of the membrane is achieved.

On that side of the Peltier means/elements which is not thermally coupled to the membrane or its coating, measures should be taken to ensure uniform removal of heat. In a particularly preferred embodiment, the side of the Peltier means or of the Peltier elements which is not connected to the membrane leads directly or via an interposed heat-conducting connection onto that side of the protective material which in the use scenario faces the surroundings.

As far as the connection of the membrane to the supporting material of the protective material according to the present invention is concerned, the membrane should be bonded to the supporting material at least essentially uniformly. But in another preferred embodiment according to the present invention, the membrane is bonded to the supporting material sectionally, more particularly punctiformly. More particularly, the membrane can thus be laminated onto the supporting layer by means of a preferably punctiformly applied adhesive. The supporting layer acts as a quasi carrier layer for the membrane and enhances the mechanical stability and tensile strength of the membrane. Useful adhesives for the present invention in this context include conventional adhesives, for example polyurethane-based adhesives or the like.

The supporting material used according to the present invention can be a woven fabric, a loop-formingly knitted fabric, a loop-drawingly knitted fabric, a nonwoven scrim, a batt or a bonded textile fabric. In addition, the supporting material can have a basis weight of 20 to 250 $g/m^2$, especially 30 to 150 $g/m^2$, preferably 40 to 120 $g/m^2$. The supporting material should be abrasion resistant and more particularly consist of an abrasion-resistant textile material. In addition, the supporting material can be hydrophobicized and/or oleophobicized and/or plasma treated to further enhance the protective performance with regard to chemical and biological poisonous/noxiant agents.

The supporting material is also the covering layer, as it were, and in the donned or use state of the resulting protective material of the present invention is preferably disposed on the wearer-remote side of the membrane. The supporting material may include or consist of natural and/or manufactured fibers. The supporting material preferably consists of manufactured fibers, more preferably from the group of polyamides, polyesters, polyolefins, polyurethanes, polyvinyl (polyvinyl alcohols, for example) and/or polyacrylic.

As previously mentioned, the supporting material may be in an oleo- and/or hydrophobicized state, more particularly in order that in the event of relatively large drops of noxiant and poisonous agents being incident these be distributed on the surface of the protective material of the present invention, or in order to let them "bead off" the surface; oleo- and hydrophobicizing agents suitable for this purpose are well known to a person skilled in the art (examples being fluoropolymers, such as fluorocarbon resins). The supporting material can further be additized with a flame retardant (with a phosphoric ester, for example). The supporting material may further be in an antistaticized state. Furthermore, a camouflage print can also be provided to the supporting material, especially in the manufacture of NBC protective suits.

The supporting material used in the realm of the present invention should have a thickness or to be more precise cross-sectional thickness of 0.05 to 5 mm, preferably 0.1 to 1 mm and especially 0.2 to 0.5 mm.

In a further embodiment preferred according to the present invention, the protective material according to the present invention also comprises an adsorptive layer based on an adsorptive material adsorbing especially chemical and/or biological poisons and/or noxiants, in which case more particularly the adsorptive layer is assigned to that side of the membrane which faces away from the supporting material. The purposive additization of the protective material according to the present invention with an additional adsorptive layer has the effect of yet further improving the protective effects as a whole. In this context, the membrane should be disposed in the donned state on that side of the adsorptive layer which faces the noxiant source/exposure, so the membrane acts as a barrier layer in front of the adsorptive layer. This has the advantage that a large proportion of the poisonous/noxiant agents are kept away from the adsorptive layer by the membrane and therefore the adsorptive layer is virtually inexhaustible. The use of an adsorptive layer also has the advantage that even in the event of very high noxiant concentrations, more particularly when the membrane incurs damage due to mechanical influences, poisonous/noxiant agents penetrating into the protective material can be effectively adsorbed. The membrane can similarly act as a supporting material for the adsorptive layer, in which case the adsorptive layer can be bonded to the membrane by means of a punctiform or a point grid application of adhesive, for example. This results in a high accessibility of the adsorbents for the poisonous/noxiant agents to be adsorbed, in particular wherein at least 30%, more particularly at least 40%, preferably at least 50% and more preferably at least 70% of the surface of the adsorbents should be freely accessible to the poisonous/noxiant agents, i.e., not covered with adhesive.

The adsorptive material of the adsorptive layer may be a material based on activated carbon, especially in the form of activated-carbon particles or activated-carbon fibers.

The use of activated carbon as adsorptive material also has the advantage that the buffering effect of the activated carbon serves to additionally improve the wearing comfort in that the activated carbon serves as a moisture/water store or buffer (for perspiration, for example).

The adsorptive layer is preferably configured as an adsorptive sheetlike filter. The adsorptive layer may comprise by way of adsorptive material discrete particles of activated carbon, preferably in granule form ("granulocarbon") or sphere form ("spherocarbon"), wherein the average diameter of the activated-carbon particles may be less than 1.0 mm, preferably less than 0.8 mm and more preferably less than 0.6 mm.

Granulocarbon, especially spherocarbon, has the decisive advantage that it is supremely abrasion resistant and very hard, which is very important in relation to the wear-and-tear properties. Preferably, the bursting pressure of an individual activated-carbon particle, especially activated-carbon granule or spherule, is generally at least about 5 N, especially at least about 10 N, and can be up to about 20 N. In this embodiment, the amount in which the activated-carbon granules are applied to the membrane or any optional further supporting material is generally in the range from 5 to 500 g/m$^2$, especially in the range from 10 to 400 g/m$^2$, preferably in the range from 20 to 300 g/m$^2$ and more preferably in the range from 25 to 250 g/m$^2$.

In an alternative embodiment, the adsorptive layer may comprise by way of adsorptive material activated-carbon fibers, especially in the form of an activated-carbon fabric. Activated-carbon fabrics of this type may have for example a basis weight of 20 to 200 g/m$^2$, especially 50 to 150 g/m$^2$. These activated-carbon fabrics may be for example a woven, loop-formingly knitted, nonwoven-scrim or bonded activated-carbon fabric, for example based on carbonized and activated cellulose and/or a carbonized and activated acrylonitrile.

It is similarly possible in the realm of the present invention to combine activated-carbon particles on the one hand and activated-carbon fibers on the other to form the adsorptive layer. In this context, activated-carbon particles form the advantage of a higher adsorptive capacity, while activated-carbon fibers have superior adsorption kinetics.

The activated carbon used according to the present invention preferably has an internal surface area (BET) of at least 800 m$^2$/g, especially at least 900 m$^2$/g, preferably at least 1000 m$^2$ and more preferably in the range from 800 to 2000 m$^2$/g.

In the realm of the present invention, a spacer layer may also be disposed between the membrane and the adsorptive layer and it may take the form for example of a batt (nonwoven), of a thin layer of foamed plastic or of a textile fabric (a loop-formingly knitted fabric, for example). The additional spacer layer has the advantage of reducing the mechanical load on the adsorptive layer on the one side and the membrane on the other, since an additional layer between the membrane on the one side and the adsorptive layer on the other is able to absorb or cushion mechanical stresses. When a spacer layer is used, the adsorptive layer may be more particularly bonded to the spacer layer by means of a point grid application of adhesive. In addition, on that side which faces away from the adsorptive layer, the spacer layer can similarly be bonded to the membrane in point grid fashion. The basis weight of the spacer layer should be in the range from 5 to 100 g/m$^2$, especially in the range from 10 to 75 g/m$^2$ and preferably in the range from 15 to 50 g/m$^2$.

It may similarly be envisaged in the realm of the present invention for the protective material to comprise an inner layer, especially an inner lining. In this case, the inner layer can be assigned to that side of the membrane which faces away from the supporting material. In this context, the inner lining can be more particularly adhered in point grid fashion to the membrane, provided no adsorptive layer is used. When an additional adsorptive layer is used, the inner lining can be mounted on that side of the adsorptive layer which is opposite the membrane, in which case a more particularly point-grid adhesive bond can also be provided in this regard. The use of an inner layer, provided no additional adsorptive layer is provided, similarly leads to a protective function with regard to the membrane. When an adsorptive layer is used, the adsorptive layer is additionally protected from contamination due to the wearer, such as perspiration for example. Thus the efficiency of the adsorptive layer is also enhanced in this way. In addition, the inner layer, which faces the wearer in the donned state, enhances the wearing comfort, especially the wearer's experience of the protective material of the present invention as soft.

It can be envisaged according to the present invention for the inner layer to be configured in the form of a textile fabric. For example, the inner layer can be a woven fabric, a loop-formingly knitted fabric, a loop-drawingly knitted fabric, a nonwoven scrim, a bonded textile fabric or a batt. Useful materials in this regard include the materials already mentioned above for the supporting material. The inner layer should have a basis weight of 5 to 100 g/m$^2$, especially 10 to 75 g/m$^2$, preferably 15 to 50 g/m$^2$.

The protective material as a whole may have an overall basis weight of 150 to 1000 g/m$^2$, especially 200 to 800 g/m$^2$, preferably 250 to 600 g/m$^2$ and more preferably 300 to 500 g/m$^2$. In addition, the protective material should have a thickness or to be more precise an overall cross-sectional thickness of 0.1 mm to 20 mm, especially 0.5 mm to 15 mm, preferably 1 mm to 10 mm and more preferably 2 mm to 5 mm.

It is particularly advantageous for the protective material of the present invention at 25° C. and at a 50 μm thickness of membrane to have in the event of an opened membrane a water vapor transmission rate of at least 10 l/m$^2$ per 24 h, especially at least 15 l/m$^2$ per 24 h, preferably at least 20 l/m$^2$ per 24 h. The protective material at a 50 μm thickness of membrane should additionally have in the event of an opened membrane a water vapor transmission resistance $R_{et}$ under steady-state conditions, as measured to DIN EN 31 092:1993 (February 1994) and ISO 11 092, at 35° C., of at most 30 (m$^2$·pascal)/watt, especially at most 25 (m$^2$·pascal)/watt, preferably at most 15 (m$^2$·pascal)/watt. Finally, the protective material of the present invention at a 50 μm thickness of membrane should have a barrier effect with regard to chemical warfare agents, especially bis[2-chloroethyl] sulfide (mustard gas, Hd, Yellow Cross), as measured in the diffusive flow test, permitting permeation of at most 4 μg/cm$^2$ per 24 h, especially at most 3.5 μg/cm$^2$ per 24 h, preferably at most 3.0 μg/cm$^2$ per 24 h and more preferably at most 2.5 μg/cm$^2$ per 24 h. The diffusive flow test is known per se to a person skilled in the art and is also further elucidated in the context of the exemplary embodiments.

The invention also provides a membrane as claimed herein, which is intended and suitable for deployment in a functional protective material of the type in question. Preferred embodiments and developments of this membrane as such form the subject matter of one or more claims.

The present invention further provides—in accordance with yet a further aspect of the present invention—the use of the functional protective material of the present invention and/or of the membrane of the present invention in the manufacture of protective articles of any kind, such as protective suits, protective gloves, protective footwear and other protective apparel pieces and also protective covers, sleeping bags, tents and the like, preferably for NBC deployment, both for civil and military applications.

The present invention yet further provides—in accordance with yet a further aspect of the present invention— protective articles, especially protective suits, protective gloves, protective footwear and other protective apparel pieces and also protective covers, sleeping bags and the like, obtained using the protective material of the present invention and/or the membrane of the present invention and/or comprising the protective material and/or membrane of the present invention.

It will be appreciated that elaborations, embodiments, advantages and the like which are recited hereinbelow in respect of one aspect of the invention only to avoid repetition shall self-evidently also apply mutatis mutandis in respect of the other aspects of the invention.

The invention will now be more particularly elucidated with reference to a drawing depicting a preferred exemplary embodiment. Further advantages, properties, aspects and features of the present invention are also described in connection with the elucidation of a preferred exemplary embodiment of the invention.

Figure 1:
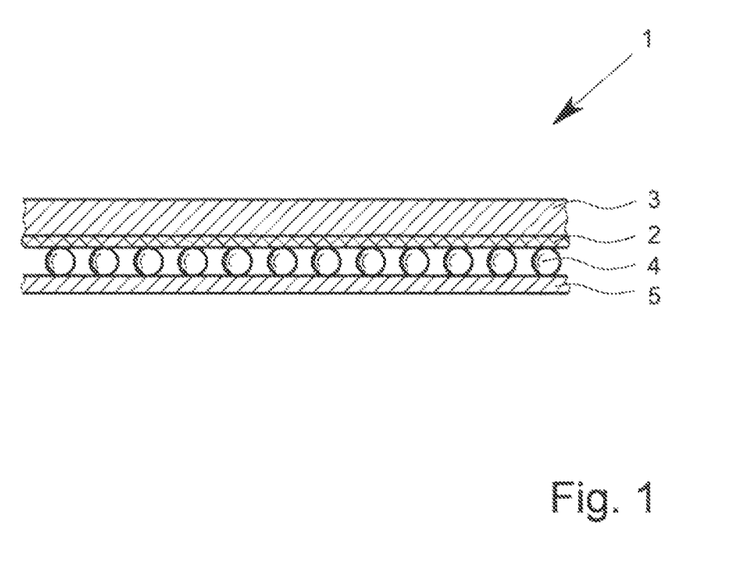
FIG. 1 shows a schematic sectional depiction through the layered construction of an inventive functional protective material as per a preferred embodiment of the invention.
Figure 2A:
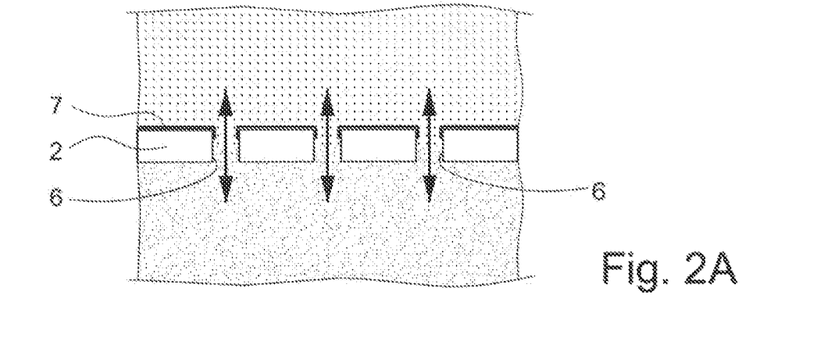
FIG. 2 shows a schematic depiction of an enlarged section through the region of the membrane of the protective material of FIG. 1 in three different operating states.
Figure 2B:
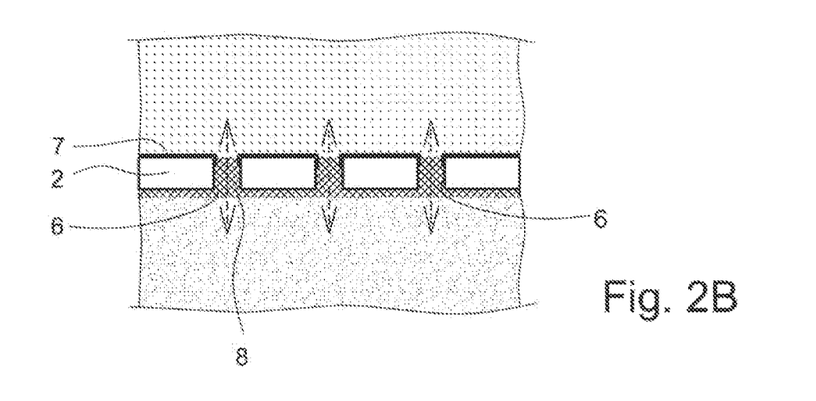
Figure 2C:
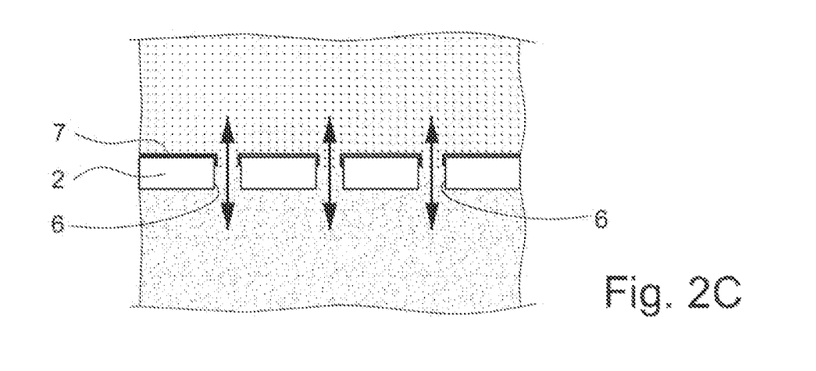
Figure 3:
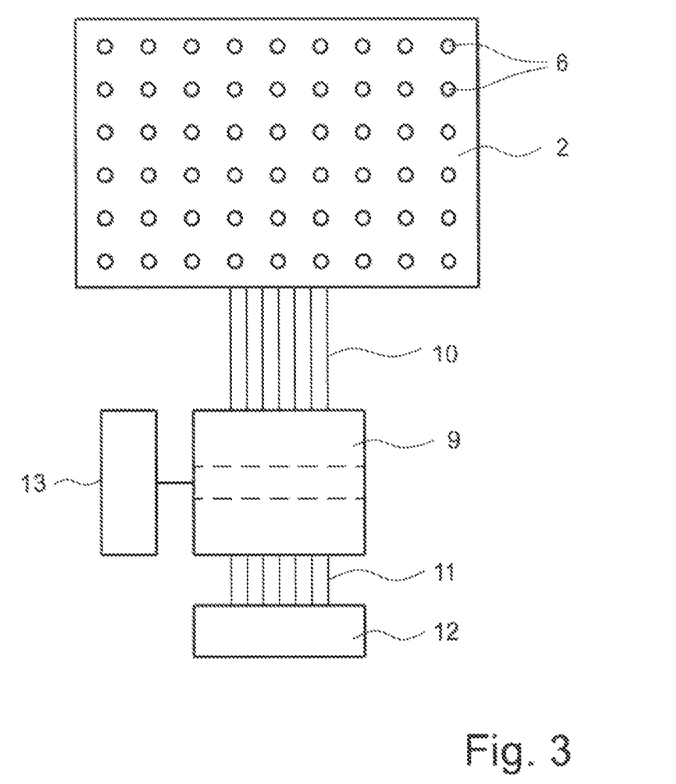
FIG. 3 shows a schematic depiction of a membrane of the functional protective material of FIG. 1 in combination with an assigned means for controlling the porosity of this membrane.
Figure 4:
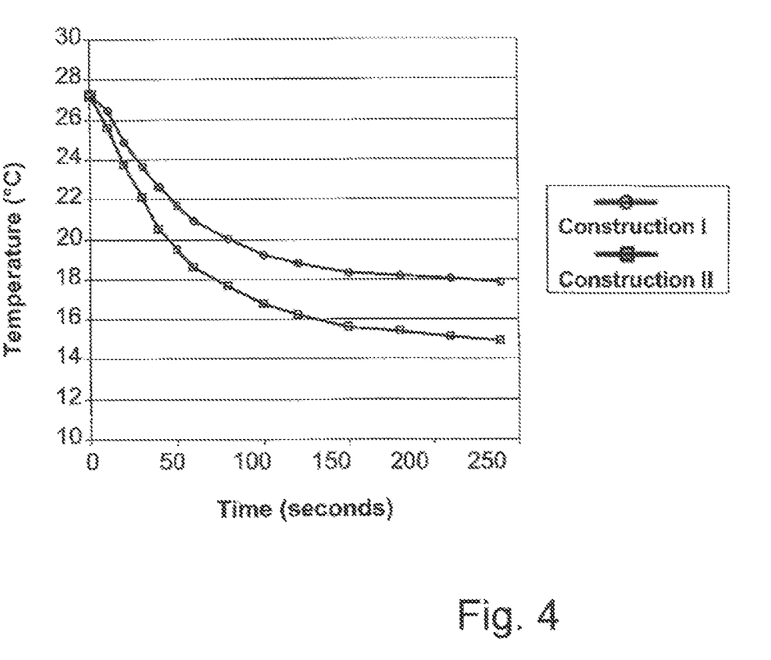
FIG. 4 shows a diagram for depicting the results of two experimental constructions of an exemplary embodiment of the type in question.
Figure 5:
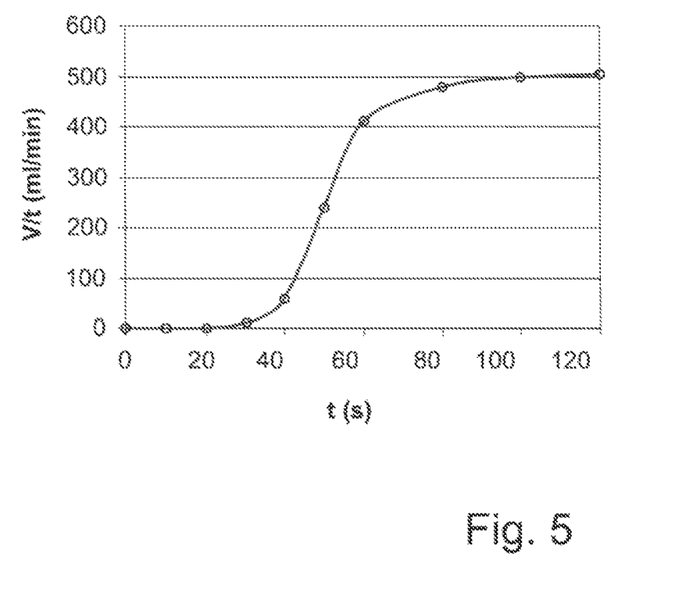
FIG. 5 shows a further diagram resulting from an experimental construction for an exemplary embodiment of a functional protective material as per the invention.

In the drawing,

FIG. 1 shows a schematic sectional depiction through the layered construction of an inventive functional protective material as per a preferred embodiment of the invention, FIG. 2 shows a schematic depiction of an enlarged section through the region of the membrane of the protective material of FIG. 1 in three different operating states, FIG. 3 shows a schematic depiction of a membrane of the functional protective material of FIG. 1 in combination with an assigned means for controlling the porosity of this membrane, FIG. 4 shows a diagram for depicting the results of two experimental constructions of an exemplary embodiment of the type in question, and FIG. 5 shows a further diagram resulting from an experimental construction for an exemplary embodiment of a functional protective material as per the invention.

FIG. 1 shows a schematic sectional depiction of the inventive functional protective material 1, especially with protective function with regard to chemical and/or biological poisons and/or noxiants, such as warfare agents. This functional protective material 1 according to the invention comprises a multilayered construction, said multilayered construction including a sheetlike, especially textile, supporting material 3 and a membrane 2 assigned to, especially bonded to, the supporting material 3. The figure further shows the additization of the inventive protective material 1 with an optional adsorptive layer 4 on membrane 2. Finally, the figure shows the inventive embodiment wherein an inner layer 5 which, in the donned state, faces the wearer is optionally provided to the inventive protective material 1. With regard to the mechanical, physical and/or chemical properties of the aforementioned layers/plies and/or of the inventive protective material 1 per se, reference can be made to the above explanations, which apply mutatis mutandis in respect of the specific embodiment.

FIG. 2, then, shows in three different functional states the membrane 2 of a functional protective material 1 of the type according to the present invention in order that the function of porosity-controllable/switchable membrane 2 may be elucidated.

The closely dotted pattern at the bottom of FIG. 2A is that side of membrane 2 which, in the donned state of the functional protective material 1 of the type in question, normally faces the wearer. The wearer/user of such a functional protective material 1, especially in a protective suit, has a high rate of sweat secretion, i.e., the atmospheric humidity is high here. The less closely dotted region depicted at the top of FIG. 2A is that region which in the donned state is wearer-remote, i.e., is on the outer surface of such a functional protective material 1 and in contact with the ambient atmosphere.

The double arrows in FIG. 2A indicate in respect of membrane 2 that this membrane 2 is inherently pervious to air and water vapor. This is because it has a multiplicity of micropores 6 which are preferably distributed essentially uniformly over the membrane area.

FIG. 2A shows the first operating state of membrane 2, in which the micropores 6 of membrane 2 are open. The functional protective material 1 permits efficient mass transfer through membrane 2.

FIG. 2B, then, shows in schematic depiction that the operating parameter of membrane 2 has changed here in accordance with the present invention. Membrane 2 is now in its second operating state in which the micropores 6 of membrane 2 are at least predominantly, completely as depicted here, closed. This is indicated by the double arrows now reduced to a thin and broken-line depiction.

In a preferred embodiment of the present invention, the operating parameter is the operating temperature of the membrane 2 and the first operating state is achievable by heating the membrane 2 from a low operating temperature to a high operating temperature and the second operating state is achievable by cooling the membrane 2 from a high operating temperature to a low operating temperature.

As already elucidated in the general part of the description, the high operating temperature of the membrane 2 lies at 25° C. to 40° C. and the low operating temperature of the membrane 2 lies by about 5° C. to 25° C., preferably about 6° C. to 15° C., below the high operating temperature of the membrane 2 for the customary operating states contemplated here.

The depicted and preferred exemplary embodiment indicates the method which is preferred according to the present invention of not using a hydrogel but using directly condensed water to close the micropores 6. FIG. 2B indicates by the crossed hatching that the micropores 6 are closed in the second operating state of the membrane 2 by water 8 present in the micropores 6, more particularly held therein by adhesion. The water 8 in the air due to perspiration condenses on the inside surface, at the bottom in FIG. 2B, of membrane 2 as membrane 2 cools down. Water 8 is sucked into the micropores 6 by capillary forces and closes the micropores 6. Water-insoluble exogenous substances cannot pass through the micropores 6 from the outside. But even water-soluble exogenous substances only get as far as the micropores 6 and become dissolved and retained in the water there.

FIG. 2C shows the further state where the operating temperature of membrane 2 has then been raised again. The micropores 6 are clear again, since the water in the micropores 6 has turned into water vapor.

As far as the shape and size of micropores 6 on membrane 2 is concerned, reference may be made to the general part of the description. Exhaustive particulars in this regard were provided there. The same holds in respect of preferred thicknesses for membrane 2, in respect of a preferred areal fraction of micropores 6 on membrane 2 and in respect of the choice of materials for membrane 2. Preferably, membrane 2 in the depicted exemplary embodiment is a foil of polyethylene (PE).

FIG. 2 further shows, in all three versions, that, in accordance with the preferred teaching, the membrane 2 comprises an additization, ply or, preferably, coating 7 leading to an enhanced lateral thermal conductivity of membrane 2. The coating 7, provided in accordance with preferred teaching, consists of an efficiently heat-conducting, preferably chemically inert, material, especially a metal or a metal alloy, most particularly gold. The depicted and preferred exemplary embodiment here shows that the coating of gold has a thickness between 5 nm and 1000 nm, preferably between 10 nm and 800 nm. Preferably, the thickness of the gold coating has a value of at least 100 nm, preferably of 300 nm to 700 nm.

A compromise has to be made in practice between the wish for a rapid distribution of the heat, or a rapid withdrawal of heat, on the surface of the membrane 2 on the one hand and the costs of a correspondingly efficient heat-conducting coating on the other. The recited values have proved to be very advantageous.

The depicted and preferred exemplary embodiment otherwise shows in FIG. 2 that here the coating 7 has been applied to the foil otherwise forming the membrane 2 just one-sidedly and not both-sidedly. The advantages associated with this were elucidated in the general part of the description. True, the distribution of heat in the area of the membrane 2 is not quite as efficient as with a both-sidedly applied coating 7 of the efficiently heat-conducting material. Significantly, however, the capillarity of the material of membrane 2, especially in the micropores 6, is better without such an efficiently heat-conducting coating. Particularly good closing and opening times of just a few minutes are thus obtained with membrane 2 as depicted according to the present invention.

FIG. 3 further shows the arrangement which is suitable to influence membrane 2 appropriately to achieve the various operating states. Membrane 2 with micropores 6 is schematically indicated, merely for the purposes of elucidating the principle, in FIG. 3 at the top. In the depiction, then, the membrane 2 is thermally coupled to a means 9 for cooling and preferably also for heating the membrane 2 and/or a ply or coating 7 of membrane 2. In the depicted exemplary embodiment, the intensive thermal coupling is indicated by the many parallel strokes between the means 9 and the membrane 2. They represent the inner heat-conducting connection 10.

In a further embodiment according to preferred teaching, the means 9 is an electrothermally operating means, preferably embodied as Peltier means, particularly embodied as a plurality of Peltier elements distributed across the membrane 2. This conception was exhaustively elucidated in the general part of the description, including the reference to sources in the prior art. Reference may be made to these observations.

The depicted and preferred exemplary embodiment further provides that the side of Peltier means 9 or of the Peltier elements which is not connected to the membrane 2 leads directly or via an interposed heat-conducting connection 11 onto that side of the protective material 1 which in the use scenario faces the surroundings. The heat-conducting connection 11 leading to a heat exchanger 12 on that side of protective material 1 which in the use scenario faces the surroundings is visible. FIG. 3 further indicates an electronic control 13 which the user can use to specifically control/switch the porosity of membrane 2.

FIG. 4 shows examples of two experimental constructions for cooling a membrane 2 using a group of Peltier elements. The two constructions differ by the testing apparatuses used. Both cases used a PE film 36 µm in thickness with micropores 6 accounting for about 10% of the area and having an average diameter of 9.5 µm. It is apparent that a temperature difference of about 9° C. was reached after about 250 s in one case of cooling. Using the other testing apparatus, which permitted a somewhat better heat transfer from Peltier element 9 to membrane 2, a 12° C. cooling was achieved over the same period. In both cases the micropores 6 were in a completely closed state thereafter, a differential pressure of about 8 mbar being readily measurable.

FIG. 5 shows the effective flow cross section of the illustratively tested material of membrane 2. Here the opposite path results on opening membrane 2. At first, membrane 2 was still cool and the micropores 6 were still in a closed state. After about 40 s of heating by the Peltier element 9, the micropores 6 began to open and were completely open after about 100 s.

With regard to further preferred embodiments of the inventive protective material 1 with regard to the various layers depicted in FIG. 1—membrane 2, supporting material 3, absorption layer 4, inner layer 5—reference may be made to the general part of the description and the further, dependent claims in this regard.

LIST OF REFERENCE SIGNS 1 protective material
2 membrane
3 supporting material
4 adsorptive layer
5 inner layer
6 micropores
7 coating
8 condensed water
9 Peltier means
10 heat-conducting connection, inside
11 heat-conducting connection, outside
12 heat exchanger, outside
13 control

What is claimed is:
1. A functional protective material having protective function with regard to at least one of chemical and biological poisons or noxiants,
wherein the functional protective material comprises a multilayered construction,
said multilayered construction including:
a sheetlike textile supporting material and
a membrane assigned to the supporting material,
wherein the membrane is inherently air-pervious and water-vapor pervious by virtue of having a multiplicity of micropores distributed uniformly over the membrane area,
wherein an operating parameter of the membrane is altered by a control such that the membrane assumes two different operating states, wherein the micropores of the membrane are open in the first operating state and at least predominantly closed in the second operating state,
wherein the micropores are closed in the second operating state of the membrane by liquid water present in the micropores, wherein closing the micropores in the membrane utilizes water which, in the second operating state, condenses on the membrane and closes the micropores in the membrane and wherein the ingress of water into the micropores is due to the action of the capillary forces which occur in the micropores, and
wherein the operating parameter is the operating temperature of the membrane and the first operating state is achieved by heating the membrane from a low operating temperature to a high operating temperature and the second operating state is achieved by cooling the membrane from a high operating temperature to a low operating temperature.

2. The protective material as claimed in claim 1, wherein the high operating temperature of the membrane lies at about 25° C. to about 40° C. and the low operating temperature of the membrane lies by about 5° C. to about 25° C. below the high operating temperature of the membrane.

3. The protective material as claimed in claim 1, wherein the micropores of the membrane have a uniform shape and size.

4. The protective material as claimed in claim 1, wherein the micropores of the membrane have an average diameter sufficiently small to hold water in the micropores by capillary force.

5. The protective material as claimed in claim 1, wherein the membrane has a thickness between 1 µm and 500 µm.

6. The protective material as claimed in claim 1, wherein the area fraction of micropores on the membrane is between 1% and 50%.

7. The protective material as claimed in claim 1, wherein the membrane is embodied as a foil of plastic, ceramic or metal or as a multi-ply foil having plies of plastic and/or ceramic and/or metal.

8. The protective material as claimed in claim 1, wherein the membrane comprises or consists of a plastic and/or a polymer.

9. The protective material as claimed in claim 1, wherein the membrane is thermally coupled to a means for cooling and/or for heating the membrane and/or a ply or coating of the membrane, wherein the means is an electrothermally operating means embodied as Peltier means.

10. The protective material as claimed in claim 1, wherein the membrane is bonded to the supporting material uniformly, sectionally or punctiformly.

11. The protective material as claimed in claim 1, wherein the supporting material is a woven fabric and has a basis weight of 20 to 250 g/m² and comprises an abrasion-resistant textile material.

12. The protective material as claimed in claim 1, wherein the protective material comprises an adsorptive layer based on an adsorptive material adsorbing chemical or biological poisons and/or noxiants.

13. The protective material as claimed in claim 12, wherein the adsorptive layer is discontinuous and is configured as an adsorptive sheetlike filter.

14. The protective material as claimed in claim 12, wherein the adsorptive material of the adsorptive layer is a material based on activated carbon.

15. The protective material as claimed in claim 1, wherein the protective material comprises an inner layer, wherein the inner layer is disposed on that side of the membrane which faces away from the supporting material.

16. The protective material as claimed in claim 1, wherein the protective material has an overall basis weight of 150 to 1,000 g/m² and an overall cross-sectional thickness of 0.1 mm to 20 mm.

17. The protective material as claimed in claim 1, wherein the protective material at 25° C. and at a 50 µm thickness of membrane has in the event of an opened membrane a water-vapor transmission rate of at least 10 l/m² per 24 h and/or a water-vapor transmission resistance $R_{et}$ under steady-state conditions, as measured to DIN EN 31 092: 1993 (February 1994) and ISO 11 092, at 35° C., of at most 30 (m²·pascal)/watt.

18. A membrane for use in a functional protective material having protective function with regard to at least one of chemical and biological poisons or noxiants,
   wherein the membrane is inherently air-pervious and water-vapor pervious by virtue of having a multiplicity of micropores distributed uniformly over the membrane area,
   wherein an operating parameter of the membrane is altered by a control such that the membrane assumes two different operating states, wherein the micropores of the membrane are open in the first operating state and at least predominantly closed in the second operating state,
   wherein the micropores are closed in the second operating state of the membrane by liquid water present in the micropores, wherein closing the micropores in the membrane utilizes water which, in the second operating state, condenses on the membrane and closes the micropores in the membrane and wherein the ingress of water into the micropores is due to the action of the capillary forces which occur in the micropores, and
   wherein the operating parameter is the operating temperature of the membrane and the first operating state is achieved by heating the membrane from a low operating temperature to a high operating temperature and the second operating state is achieved by cooling the membrane from a high operating temperature to a low operating temperature.

19. Protective articles for the civil or military sector, wherein the articles are selected from the group consisting of protective apparel, protective suits, protective gloves, protective footwear, protective socks, protective headgear, protective covers, protective tents, protective sleeping bags, wherein the protective articles comprise a protective material as claimed in claim 1 or a membrane as claimed in claim 18.

20. A functional protective material having protective function with regard to at least one of chemical and biological poisons or noxiants,
   wherein the functional protective material comprises a multilayered construction,
   said multilayered construction including:
      a sheetlike textile supporting material and
      a membrane assigned to the supporting material,
   wherein the membrane is inherently air-pervious and water-vapor pervious by virtue of having a multiplicity of micropores having a uniform shape and size and being distributed uniformly over the membrane area,
   wherein an operating parameter of the membrane is altered by a control such that the membrane assumes two different operating states, wherein the micropores of the membrane are open in the first operating state and at least predominantly closed in the second operating state,
   wherein the micropores are closed in the second operating state of the membrane by liquid water present in the micropores, wherein closing the micropores in the membrane utilizes water which, in the second operating state, condenses on the membrane and closes the micropores in the membrane and wherein the ingress of water into the micropores is due to the action of the capillary forces which occur in the micropores, and
   wherein the operating parameter is the operating temperature of the membrane and the first operating state is achieved by heating the membrane from a low operating temperature to a high operating temperature and the second operating state is achieved by cooling the membrane from a high operating temperature to a low operating temperature.

21. A functional protective material having protective function with regard to at least one of chemical and biological poisons or noxiants,
wherein the functional protective material comprises a multilayered construction,
said multilayered construction including:
a sheetlike textile supporting material and
a membrane assigned to the supporting material,
wherein the membrane is inherently air-pervious and water-vapor pervious by virtue of having a multiplicity of micropores having a uniform shape and size and being distributed uniformly over the membrane area,
wherein an operating parameter of the membrane is altered by a control such that the membrane assumes two different operating states, wherein the micropores of the membrane are open in the first operating state and at least predominantly closed in the second operating state,
wherein the micropores are closed in the second operating state of the membrane by liquid water present in the micropores, wherein closing the micropores in the membrane utilizes water which, in the second operating state, condenses on the membrane and closes the micropores in the membrane and wherein the ingress of water into the micropores is due to the action of the capillary forces which occur in the micropores, and
wherein the operating parameter is the operating temperature of the membrane and the first operating state is achieved by heating the membrane from a low operating temperature to a high operating temperature and the second operating state is achieved by cooling the membrane from a high operating temperature to a low operating temperature, wherein the high operating temperature of the membrane lies at about 25° C. to about 40° C. and the low operating temperature of the membrane lies by about 5° C. to about 25° C. below the high operating temperature of the membrane.

22. A functional protective material having protective function with regard to at least one of chemical and biological poisons or noxiants,
wherein the functional protective material comprises a multilayered construction,
said multilayered construction including:
a sheetlike textile supporting material and
a membrane assigned to the supporting material,
wherein the membrane is inherently air-pervious and water-vapor pervious by virtue of having a multiplicity of micropores having a uniform shape and size and being distributed uniformly over the membrane area,
wherein an operating parameter of the membrane is altered by a control such that the membrane assumes two different operating states, wherein the micropores of the membrane are open in the first operating state and at least predominantly closed in the second operating state,
wherein the micropores are closed in the second operating state of the membrane by liquid water present in the micropores, wherein closing the micropores in the membrane utilizes water which, in the second operating state, condenses on the membrane and closes the micropores in the membrane and wherein the ingress of water into the micropores is due to the action of the capillary forces which occur in the micropores,
wherein the micropores of the membrane have an average diameter sufficiently small to hold the water in the micropores, and
wherein the operating parameter is the operating temperature of the membrane and the first operating state is achieved by heating the membrane from a low operating temperature to a high operating temperature and the second operating state is achieved by cooling the membrane from a high operating temperature to a low operating temperature, wherein the high operating temperature of the membrane lies at about 25° C. to about 40° C. and the low operating temperature of the membrane lies by about 5° C. to about 25° C. below the high operating temperature of the membrane.

23. A functional protective material having protective function with regard to at least one of chemical and biological poisons or noxiants,
wherein the functional protective material comprises a multilayered construction,
said multilayered construction including:
a sheetlike textile supporting material and
a membrane assigned to the supporting material,
wherein the membrane is inherently air-pervious and water-vapor pervious by virtue of having a multiplicity of micropores distributed uniformly over the membrane area,
wherein an operating parameter of the membrane is altered by a control such that the membrane assumes two different operating states, wherein the micropores of the membrane are open in the first operating state and at least predominantly closed in the second operating state,
wherein the micropores are closed in the second operating state of the membrane by liquid water present in the micropores, wherein closing the micropores in the membrane utilizes water which, in the second operating state, condenses on the membrane and closes the micropores in the membrane and wherein the ingress of water into the micropores is due to the action of the capillary forces which occur in the micropores,
wherein the operating parameter is the operating temperature of the membrane and the first operating state is achieved by heating the membrane from a low operating temperature to a high operating temperature and the second operating state is achieved by cooling the membrane from a high operating temperature to a low operating temperature, and wherein the functional protective material is free of a hydrogel.

24. A functional protective material having protective function with regard to at least one of chemical and biological poisons or noxiants,
wherein the functional protective material comprises a multilayered construction,
said multilayered construction including:
a sheetlike textile supporting material and
a membrane assigned to the supporting material,
wherein the membrane is inherently air-pervious and water-vapor pervious by virtue of having a multiplicity of micropores distributed uniformly over the membrane area,
wherein the micropores of the membrane have an average diameter between 1 μm and 15 μm,
wherein the membrane has a thickness between 1 μm and 500 μm,
wherein an operating parameter of the membrane is altered by a control such that the membrane assumes two different operating states, wherein the micropores of the membrane are open in the first operating state and at least predominantly closed in the second operating state, wherein the micropores are closed in the second operating state of the membrane by liquid water present in the micropores, wherein closing the micropores in the membrane utilizes water which, in the second operating state, condenses on the membrane and closes the micropores in the membrane and wherein the ingress of water into the micropores is due to the action of the capillary forces which occur in the micropores, and wherein the operating parameter is the operating temperature of the membrane and the first operating state is achieved by heating the membrane from a low operating temperature to a high operating temperature and the second operating state is achieved by cooling the membrane from a high operating temperature to a low operating temperature.

25. A functional protective material having protective function with regard to at least one of chemical and biological poisons or noxiants, wherein the functional protective material comprises a multilayered construction, said multilayered construction including:

a sheetlike textile supporting material and a membrane assigned to the supporting material, wherein the membrane is inherently air-pervious and water-vapor pervious by virtue of having a multiplicity of micropores distributed uniformly over the membrane area, wherein an operating parameter of the membrane is altered by a control such that the membrane assumes two different operating states, wherein the micropores of the membrane are open in the first operating state and at least predominantly closed in the second operating state, wherein the micropores are closed in the second operating state of the membrane by liquid water present in the micropores, wherein closing the micropores in the membrane utilizes water which, in the second operating state, condenses on the membrane and closes the micropores in the membrane and wherein the ingress of water into the micropores is due to the action of the capillary forces which occur in the micropores, and wherein the operating parameter is the operating temperature of the membrane and the first operating state is achieved by heating the membrane from a low operating temperature to a high operating temperature and the second operating state is achieved by cooling the membrane from a high operating temperature to a low operating temperature, and wherein the membrane comprises an additization, ply or coating leading to an enhanced lateral thermal conductivity of the membrane.

* * * * *